Patented Sept. 26, 1939

2,174,438

UNITED STATES PATENT OFFICE 2,174,438

PROCESS OF MAKING ADHESIVE OR SIZING MATERIAL

John F. Corwin and Henry V. Dunham, Bainbridge, N. Y.

No Drawing. Application February 17, 1937, Serial No. 126,306

4 Claims. (Cl. 134—20)

Our invention relates to protein products derived from vegetable materials and to a process of making the same. More particularly, our invention relates to protein products suitable for adhesives, glues, sizings and coatings made from materials containing vegetable protein, such as the cake obtained by removing the oil, in whole or in part, from oleaginous seeds, or the flour or meal made by grinding this cake. For example, this invention is concerned with the treatment of the cake, meal or flour so obtained from soya beans, peanuts, cottonseed, linseed and other similar oil-bearing seeds to obtain products of a similar type.

One previously used treatment consists in grinding the seed meal so that it will pass through a very fine mesh—about 200 or finer. This may then be prepared for use by treatment with an alkali. Such meals, which are herein referred to as "finely ground seed meals" are largely used in the production of wood glues and have been proposed for use (but actually used to only a very limited extent) as sizings.

It has also been proposed to isolate the protein or a portion of the various proteins of the vegetable protein containing materials by dissolving, or dispersing, the protein in water, and then precipitating all or part of the so dissolved or dispersed protein from the resulting solution by the addition of an acid, followed by the removal of the supernatant liquid, and drying the coagulated protein. Such a product is herein referred to as an "isolated protein".

We have found in practice, however, that these finely ground seed meals and isolated proteins possess undesirable properties which detract from their value as paper coatings, sizings, glues and the like. Thus, if finely ground seed meals are used in glues or sizings, the cellulose or cellulose-like materials which are insoluble in the usual protein solvents, have the disadvantage of acting as diluents for the protein as well as rendering the application of the glue or sizing (especially the latter) to the material being coated, more difficult. The finely ground seed meals also result in more viscous solutions or liquids, these meals having higher water requirements and consequently giving less adhesive and usually rougher coatings which contain less of the protein itself. By "water requirements" as herein used, is meant the amount of water necessary to obtain a good flowing and easily applied adhesive or coating mixture.

We have found that the proteins precipitated by acid, the so-called "isolated proteins", have been changed in some manner, by the acid treatment. This change results in a decrease in solubility along with the production of viscous solutions having high water requirements, and they give inferior coatings.

The solution of an adhesive base of high water requirement contains less dissolved size per volume of solution, with the result that this extra water must be evaporated from the coating, thus lengthening the time of drying. Another disadvantage to be found in an adhesive sizing base of high water requirement is that in a coating of ordinary concentration it imparts less flow to the "color" (i. e. to the liquid containing the dissolved adhesive and the clay, satin white and/or pigments, dyes, etc.) resulting in poor flowing out or levelling of the color and in consequent brush marks. Attempts to remedy these defects by further dilution of the color necessarily produce a color with which it is difficult to obtain a sufficient weight of coating, or coverage.

One object of this invention is to provide a product and a process of making a product which overcomes the foregoing difficulties encountered with ordinary ground seed meals and with isolated proteins. Another object is to provide a dry vegetable protein product capable of being readily and completely dispersed in water or alkaline solution, and which does not require excessive amounts of dispersing medium. Besides the protein, this product contains the other alkali-soluble constituents of the meal, e. g. water-soluble and alkali-soluble carbohydrates, including gums, etc.

In general our process comprises the following steps:—Vegetable protein containing material such as seed-meal of one of the kinds above stated, and from which preferably at least the major part of the oil has been removed and which have been ground, preferably to a fine mesh, is mixed with water in a suitable mixer. A suitable quantity of alkali capable of dissolving or dispersing all or nearly all of the alkali soluble protein present is added and thoroughly mixed and heated. This heating may be to about 140° F. but we do not wish to limit ourselves to this degree of heating, which may vary for best results according to the particular proteinaceous meal, particular alkaline materials and concentrations used, and other factors. The insoluble or undispersable matter is then separated from the liquid in any convenient manner. We preferably dilute the mixture with more water and allow the insoluble material to settle. The dissolved portion may then be separated by any convenient means, for example, siphoning off, or decanting the nearly clear supernatant liquid and pressing any excess solution from the insoluble matter, or by using a centrifugal separator, etc. Other methods of separating the solution, can be used. The resulting solution may then be concentrated by heating in a vacuum pan, and further dried in a drying kiln to a point where it may be ground; or it may be dried by a spray drier of any suitable design, or by any other desirable method. The product may then be ground if the drying method used has left it in a coarse state, and can be bleached if desired or necessary (before or after drying).

This product has distinct advantages for use as a source of raw material for cold water glues for the wood-working trade, for plywood manufacture, etc., or as a size for paper coating, as an engine size in paper making, and for other adhesive or glue purposes. If desired the concentrated material may be used without further drying.

In order to more fully illustrate this invention we give herewith several examples by way of illustration. "Parts" are given by weight.

Example 1

100 parts peanut meal of such fineness that about 85% will pass through a 200 mesh standard wire screen; 400 parts cold water; 5 parts 26° Bé. ammonium hydroxide. The water is slowly added to the meal, mixing thoroughly; then the ammonium hydroxide either concentrated, or diluted with some of the water, is added. After stirring until the lumps are thoroughly broken up, the material is heated with further stirring, to about 140° F. Another 400 parts of water preferably heated to about 120° F. is now added, the whole mixed thoroughly and placed in a settling tank. After four hours the clear solution may be drawn off by decanting or in any desirable way. The solution freed from the insoluble substances is now ready to be dried and may be evaporated in a vacuum pan to a heavy consistency and then may be placed on trays in a drying kiln. The air temperature in the drying kiln may be about 115 to 140° F. preferably about 140° F. The drying in the kiln may be carried to the point where the material after removal may be ground. As an alternative drying method, the solution may be dried by means of a spray drier of any suitable design. When dried in a spray drier, the material comes out in a finely powdered condition and so can be used directly without further grinding. The spray dried material is preferred because it is more readily dispersed or re-dissolved, and has not been subjected to high temperature for as long a time.

If desired, the concentrated material may be used in a size or glue without drying.

Example 2

100 parts soya bean meal, of such a fineness that about 95% will pass through a 200 mesh standard wire screen; 400 parts cold water; 10 parts borax. The water is slowly added to the meal, mixed thoroughly and then the dry borax is sifted in, or added as a solution in the last part of the water. The mixture is agitated and heated to about 140° F. and 400 parts of water at about 120° F. are added. After mixing, the insoluble matter is allowed to settle and the clear liquid is decanted. This liquid may be dried or concentrated in any desirable way such as indicated under Example 1.

Either ammonia or borax may be used for treating the seed meal, or various other alkaline materials, such as tri-sodium phosphate, alkali metal carbonates or bicarbonates, caustic alkalies, or the like, may be used. The proportion of the alkaline material may be varied in accordance with its basicity and the character of the meal used.

It is of course understood that we do not wish to limit ourselves to the exact procedure or proportions indicated in the above examples. They are given by way of illustration. For example, the seed meal may be coarser or finer than 200 mesh. The finer meal, however, may be digested more quickly with the alkaline material and for this reason is preferred. Obviously other solvents (alkalies) than those listed may be used. The method and time of mixing, heating and settling and the amount of water used both in the dissolving step and to allow for the settling out of the insoluble material, and the time of settling, may also be varied. If desired, less water may be used and a centrifugal separator utilized for removing the insoluble portion of the meal, or a continuous filter such as the Oliver filter may be used, or any other suitable mechanical means for removing the insoluble portion of the seed meal from the soluble portion. Neither do we wish to limit ourselves in any way to any particular method of removing the water from the solution of the seed meal protein, and other water-soluble and/or alkali-soluble constituents of the meal, free or substantially free from the insoluble material. Any practical methods can be used for accomplishing these results.

The following tables comparing the viscosities and pH of solutions of different products of high protein content, prepared by this process, with those of finely ground seed meals and of isolated proteins, illustrate some advantages of our new product. In each of these experiments 100 gms. of the material being tested was mixed with a quantity of water (300 c. c. of water in Table 1, 400 c. c. in Table 2, and 500 c. c. in Table 3) together with 6.4 c. c. of 26° Bé. commercial ammonia, and the resulting liquid was then heated to 130° F. The pH of the resulting solution and its viscosity at 77° F. on a Stormer viscosimeter, using a 500 gm. weight, are given in the tables. (The Stormer viscosimeter, as is well known, gives a lower reading, the more viscous the solution.)

TABLE 1.—*Using 300 cc. of water to 100 gms. of protein material*

|  | pH | Viscosity (Stormer) |
|---|---|---|
| Ground peanut meal | 9.1 | 528 |
| Isolated protein (peanut) | 7.6 | (*) |
| Product of this invention (peanut) | 8.9 | 900 |
| Ground soya bean meal | 9.2 | (*) |
| Isolated protein (soya bean) | 8.2 | (*) |
| Product of this invention (soya bean) | 9.2 | 26 |

* Too heavy to test.

TABLE 2.—*Using 400 c. c. of water to 100 gms. of protein material*

|  | pH | Viscosity |
|---|---|---|
| Ground peanut meal | 9.1 | 1212 |
| Isolated protein (peanut) | 7.6 | (*) |
| Product of this invention (peanut) | 8.9 | 1410 |
| Ground soya bean meal | 9.2 | 18½ |
| Isolated protein (soya bean) | 8.2 | (*) |
| Product of this invention (soya bean) | 9.2 | 402 |

* Too heavy to test.

TABLE 3.—*Using 500 c. c. of water to 100 gms. of protein material*

|  | pH | Viscosity |
|---|---|---|
| Ground peanut meal | 9.1 | 1530 |
| Isolated protein (peanut) | 7.6 | 25 |
| Product of this invention (peanut) | 8.9 | 1620 |
| Ground soya bean meal | 9.2 | 234 |
| Isolated protein (soya bean) | 8.2 | 25 |
| Product of this invention (soya bean) | 9.2 | 912 |

The decrease in viscosity and consequent lower water requirements for free flowing solutions of high protein content prepared by this process, over those of finely ground meals, and isolated proteins, are clearly shown in the above tables.

The advantages of this high protein product are further illustrated by examples of its use in paper sizing compositions. The method followed in preparing each of the paper color mixtures was as follows: A sizing mixture was first prepared as a standard similar to a formula which has been used in the industry. To 129.3 gms. of the particular protein material in question, was added 300 c. c. of cold water, 10.2 gms. of commercial sodium carbonate and 3.2 c. c. of 26° commercial ammonia. This mixture was then agitated until free from lumps and heated to 130° F. The solution was diluted with water to a total volume of 435 c. c. Stirring of the diluted solution was continued until the protein was perfectly dissolved. This size was then added to the clay and satin white mixture, which was prepared as follows:—

272 gms. of commercial paper-coating grade clay was mixed with 151 c. c. of water to a smooth paste. To this was added 321.6 gms. of commercial satin white paste, containing 30% solids. After mixing these two together, the above size was added and mixed in. It was then brushed through a 200 mesh sieve (in the examples using ground seed meals an 80 mesh sieve had to be used) and 0.5 c. c. of 40% formaldehyde solution diluted with 4.5 c. c. of water, was mixed in. This color mix was then diluted with just enough water to obtain a free flowing color of good leveling properties.

Table 4 represents the results of these tests. The excess water as indicated was that amount needed in addition to that given in the above formula to produce a color of satisfactory flow. The viscosity readings of these solutions were taken at 77° F. on a MacMichael viscosimeter (which, as well known, gives a lower reading the less viscous the solution). The wax-pick or surface pick test, as shown in the table, is a standard test used to determine the strength of paper coatings. The figures indicate the degree of adhesion of the wax necessary to split the body-stock of the paper, with the higher numbers indicating the stronger coatings.

TABLE 4

|  | Excess water added c. c. | Viscosity (MacMichael) | | Wax test value |
|---|---|---|---|---|
|  |  | End of 1 hour | End of 25 hours |  |
| Protein of this invention (peanut) | 90 | 25 | 25 | 5 plus |
| Ground peanut meal | None | 545 | 85 | 4 |
| Isolated protein (peanut) | 835 | (*) | (*) | 5 plus |
| Protein of this invention (soya bean) | 280 | 120 | 70 | 6 plus |
| Ground soya bean meal | 315 | 355 | 304 | 4 |
| Isolated protein (soya bean) | 315 | (*) | (*) | 6 plus |

*Too heavy to test.

From the foregoing results and tables it will be noted that the excess of water necessary for the material using isolated protein is substantially greater than with the products of this invention. Consequently, the sizings containing products prepared according to our invention contain more protein or other adhesive per volume of size and still have a lower viscosity, resulting in better coatings. In addition the isolated proteins, due to the acid treatment, have a lower pH, require more alkaline material to redisperse them in water, and are even then dispersed or dissolved much more slowly.

On the other hand, the ground seed meal sizes may require more water to produce a free flowing color mix than the proteins of this invention. Even when using comparable amounts of water, the sizes containing ground seed meal have a much lower adhesion to paper as shown by the waxe test values set forth in Table 4.

The advantage of a lower water requirement for a sizing is especially advantageous in treating paper by a continuous process where it is desired to keep time for drying low without sacrificing the quality of the resultant surface. With the products of this invention as binding agents, this time may be regulated over a considerable range by varying the amount of water used, without deleteriously affecting the free flowing properties of the sizing composition. Furthermore, these products have the advantage of not setting, or substantially increasing in viscosity upon standing, but maintain their free flowing qualities for a very considerable period of time.

We are of course aware that in some cases, instead of or in addition to expressing the oil from oil bearing seeds in a press, the oil is extracted by suitable oil solvent liquids, and the residuum of the seed, after such extraction dried (i. e. the solvent removed from said residue) and the said residue further ground, if desired. We use the terms "seed meal" and "press cake" to cover the residue left by pressing or otherwise separating the oil (completely or largely) from oil-bearing seeds, said residue being in a comminuted (e. g. ground) condition.

We claim:
1. The process of preparing a readily dispersible adhesive base comprising dissolving matter from seed meal in an alkaline solution, separating the insoluble matter from said solution and reducing the resultant solution to substantial dryness.

2. The process of preparing a readily dispersible adhesive comprising dissolving protein and carbohydrates from ground seed meal in a relatively small amount of alkaline solution, diluting said solution with water and allowing the insoluble matter to settle, separating the insoluble matter therefrom, and evaporating the alkaline supernatant liquid to substantial dryness.

3. An improvement in the production of products containing alkali soluble proteins and alkali soluble carbohydrates, from proteinaceous seed meal which comprises digesting the said meal in an excess of dilute aqueous alkaline solution, separating the solution from the insoluble residue, and concentrating the solution while still alkaline.

4. A process of producing a product suitable for sizing paper for lithographing and the like, which comprises mixing a highly proteinaceous seed meal, with an excess of water and a small proportion of alkali, to afford a sufficient amount of water and alkali to dissolve proteins and other constituents which are soluble in said liquid, the total amount of said liquid in admixture with said meal being sufficient to allow sedimentation of the insoluble components of the said seed meal, thereafter separating the insoluble components that do not dissolve and the alkaline solution from each other, and concentrating the solution without neutralizing the alkalinity thereof.

JOHN F. CORWIN.
HENRY V. DUNHAM.